US012750736B2

(12) United States Patent
Itoh et al.

(10) Patent No.: US 12,750,736 B2
(45) Date of Patent: Sep. 29, 2026

(54) CONTROL APPARATUS, COMMUNICATION SYSTEM, CONTROL METHOD, AND NON-TRANSITORY COMPUTER-READABLE MEDIUM

(71) Applicant: NEC Corporation, Tokyo (JP)

(72) Inventors: Nobuhiko Itoh, Tokyo (JP); Eiji Takahashi, Tokyo (JP); Tansheng Li, Tokyo (JP)

(73) Assignee: NEC CORPORATION, Tokyo (JP)

( * ) Notice: Subject to any disclaimer, the term of this patent is extended or adjusted under 35 U.S.C. 154(b) by 635 days.

(21) Appl. No.: 18/266,998

(22) PCT Filed: Dec. 21, 2020

(86) PCT No.: PCT/JP2020/047615

§ 371 (c)(1),
(2) Date: Jun. 13, 2023

(87) PCT Pub. No.: WO2022/137274

PCT Pub. Date: Jun. 30, 2022

(65) Prior Publication Data

US 2024/0056893 A1 Feb. 15, 2024

(51) Int. Cl.

*H04W 28/18* (2009.01)
*H04B 7/06* (2006.01)
*H04W 72/121* (2023.01)

(52) U.S. Cl.

CPC .......... *H04W 28/18* (2013.01); *H04B 7/0691* (2013.01); *H04W 72/121* (2013.01)

(58) Field of Classification Search

CPC . H04W 28/18; H04W 72/121; H04W 72/543; H04B 7/0691

See application file for complete search history.

(56) References Cited

U.S. PATENT DOCUMENTS

| | | | | |
|---|---|---|---|---|
| 2012/0134279 A1* | 5/2012 | Tamaki | ................ | H04B 7/0452 370/248 |
| 2018/0220331 A1* | 8/2018 | Wang | ................... | H04B 7/0691 |

(Continued)

FOREIGN PATENT DOCUMENTS

| | | |
|---|---|---|
| JP | 2018-093419 A | 6/2018 |
| WO | 2018/078677 A1 | 5/2018 |

OTHER PUBLICATIONS

International Search Report for PCT Application No. PCT/JP2020/047615, mailed on Feb. 16, 2021.

*Primary Examiner* — Ashley Shivers

(57) ABSTRACT

A control apparatus (10) according to the present disclosure includes a selection unit (11) configured to select a plurality of radio terminals that perform wireless communication through one of a plurality of antennas included in a wireless network at a predetermined timing, a determination unit (12) configured to determine combinations of the plurality of antennas and the selected plurality of radio terminals, and an allocation unit (13) configured to allocate radio resources for performing wireless communication at the predetermined timing, to the plurality of radio terminals, and the selection unit (11) selects a plurality of radio terminals from all radio terminals so as to satisfy delay requirements determined for data to be transmitted or received by all the radio terminals capable of performing wireless communication through one of the plurality of antennas.

9 Claims, 9 Drawing Sheets

(56) References Cited

U.S. PATENT DOCUMENTS

| | | | | |
|---|---|---|---|---|
| 2020/0128567 | A1* | 4/2020 | Zhu | H04W 72/23 |
| 2020/0280872 | A1* | 9/2020 | Fiorani | H04W 28/24 |
| 2020/0413422 | A1* | 12/2020 | Jia | H04W 72/543 |

* cited by examiner

CONTROL APPARATUS, COMMUNICATION SYSTEM, CONTROL METHOD, AND NON-TRANSITORY COMPUTER-READABLE MEDIUM

This application is a National Stage Entry of PCT/JP2020/047615 filed on Dec. 21, 2020, the contents of all of which are incorporated herein by reference, in their entirety.

TECHNICAL FIELD

The present disclosure relates to a control apparatus, a communication system, a control method, a program, and the like.

BACKGROUND ART

In recent years, as a wireless communication technology for achieving large capacity, low latency and multi-connectivity, application of 5th generation (5G) is being studied. In a case where 5G is applied to a mobile network, an ultra-high-density distributed antenna system in which a plurality of antennas are arranged in high density, and the plurality of antennas are controlled by one control apparatus or base station is being considered. The plurality of antennas have a function called a remote unit (RU), and the base station that controls the plurality of antennas has functions called a central unit (CU) and a distributed unit (DU).

A radio terminal performs wireless communication with one of the plurality of antennas. Here, in the ultra-high-density distributed antenna system, candidates for combinations of radio terminals and antennas increase compared to a system in which one antenna covers a large communication area. Further, in the ultra-high-density distributed antenna system, as the number of radio terminals and the number of antennas increase, the number of candidates for combinations of radio terminals and antennas become enormous. Thus, a control apparatus that allocates radio resources needs to instantaneously select an optimal combination among the enormous combinations and allocate radio resources.

Patent Literature 1 discloses a configuration of a wireless network including a plurality of base stations and radio terminals that perform wireless communication with one of the plurality of base stations. Patent Literature 1 further discloses a configuration of a scheduling apparatus that selects part of the radio terminals among all the radio terminals for which the radio resources are to be scheduled as radio terminals for which scheduling is to be performed and reduces candidates for combinations of radio terminals and base stations. Specifically, the scheduling apparatus selects some radio terminals among all the radio terminals as the radio terminals for which scheduling is to be performed based on similarity of channel information indicating received strength of a radio wave, a fluctuation amount of the channel information, and the like.

CITATION LIST

Patent Literature

Patent Literature 1

Japanese Unexamined Patent Application Publication No. 2018-93419

SUMMARY OF INVENTION

Technical Problem

In processing of selecting radio terminals disclosed in Patent Literature 1, radio terminals with favorable radio quality with the base station are preferentially selected to reduce radio terminals for which scheduling is to be performed. Meanwhile, among radio terminals with poor radio quality with the base station, there are radio terminals that utilize a service with high communication quality. However, although the radio terminals utilize a service with high communication quality, radio resources are not preferentially allocated to the radio terminals with poor radio quality with the base station. This results in a problem that service quality for the radio terminals degrades.

One object of the present disclosure is to provide a control apparatus, a communication system, a control method, a program, and the like, capable of reducing the number of radio terminals for which scheduling is to be performed without degrading service quality for radio terminals capable of communicating with a plurality of antennas or base stations.

Solution to Problem

A control apparatus according to a first aspect of the present disclosure includes a selection unit configured to select a plurality of radio terminals that perform wireless communication through one of a plurality of antennas included in a wireless network at a predetermined timing, a determination unit configured to determine combinations of the plurality of antennas and the selected plurality of radio terminals, and an allocation unit configured to allocate radio resources for performing wireless communication at the predetermined timing, to the plurality of radio terminals, and the selection unit determines whether or not a criterion for satisfying service quality determined for data to be transmitted or received by each radio terminal is met for all radio terminals capable of performing wireless communication through one of the plurality of antennas and selects the plurality of radio terminals for which the criterion is not met from all the radio terminals.

A communication system according to a second aspect of the present disclosure includes a plurality of antennas included in a wireless network, and a control apparatus configured to select a plurality of radio terminals that perform wireless communication through one of the plurality of antennas at a predetermined timing, determine combinations of the plurality of antennas and the selected plurality of radio terminals and allocate radio resources for performing wireless communication at the predetermined timing, to the plurality of radio terminals, and the control apparatus determines whether or not a criterion for satisfying service quality determined for data to be transmitted or received by each radio terminal is met for all radio terminals capable of performing wireless communication through one of the plurality of antennas and selects the plurality of radio terminals for which the criterion is not met from all the radio terminals.

A control method according to a third aspect of the present disclosure includes selecting a plurality of radio terminals that perform wireless communication through one of a plurality of antennas included in a wireless network at a predetermined timing, determining combinations of the plurality of antennas and the selected plurality of radio terminals, allocating radio resources for performing wireless communication at the predetermined timing, to the plurality of radio terminals, determining whether or not a criterion for satisfying service quality determined for data to be transmitted or received by each radio terminal is met for all radio terminals capable of performing wireless communication through one of the plurality of antennas when selecting the radio terminals, and selecting the plurality of radio terminals for which the criterion is not met from all the radio terminals.

A program according to a fourth aspect of the present disclosure causes a computer to execute selecting a plurality of radio terminals that perform wireless communication through one of a plurality of antennas included in a wireless network at a predetermined timing, determining combinations of the plurality of antennas and the selected plurality of radio terminals, allocating radio resources for performing wireless communication at the predetermined timing, to the plurality of radio terminals, determining whether or not a criterion for satisfying service quality determined for data to be transmitted or received by each radio terminal is met for all radio terminals capable of performing wireless communication through one of the plurality of antennas when selecting the radio terminals, and selecting the plurality of radio terminals for which the criterion is not met from all the radio terminals.

Advantageous Effects of Invention

According to the present disclosure, it is possible to provide a control apparatus, a communication system, a control method, a program, and the like, capable of reducing the number of radio terminals for which scheduling is to be performed without degrading service quality for radio terminals capable of communicating with a plurality of antennas or base stations.

EXAMPLE EMBODIMENTS

First Example Embodiment

Figure 1:
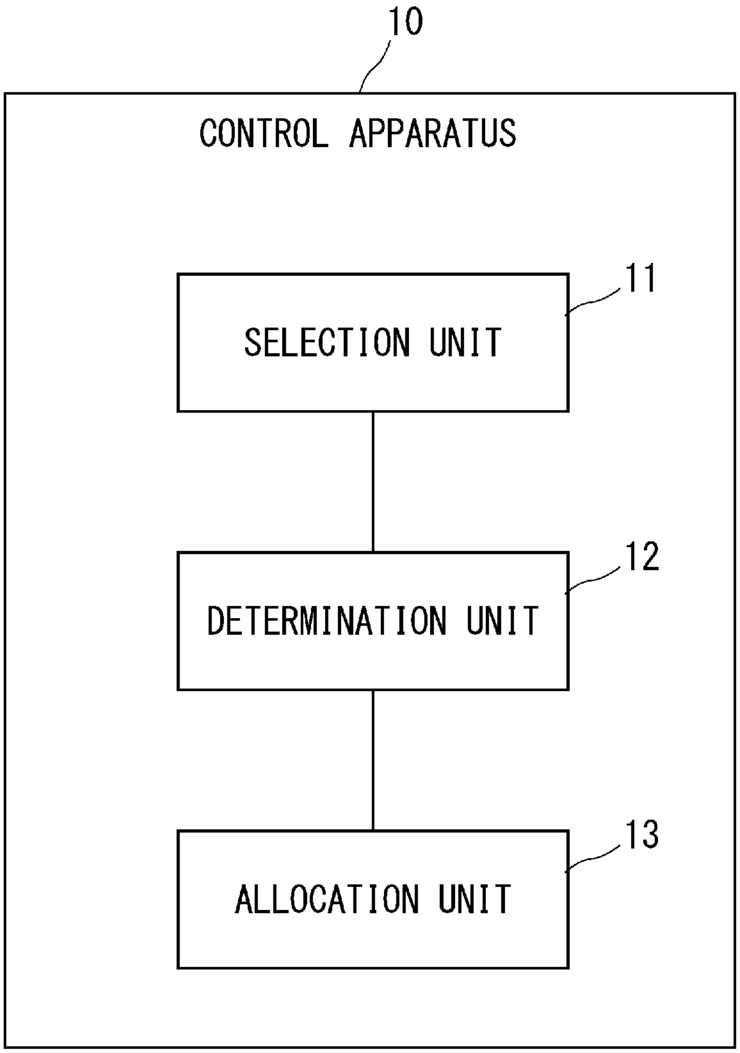
FIG. 1 is a configuration diagram of a control apparatus according to a first example embodiment.

Example embodiments of the present disclosure will be described below with reference to the drawings. A configuration example of a control apparatus 10 according to a first example embodiment will be described using FIG. 1. The control apparatus 10 may be a computer apparatus that operates by a processor executing a program stored in a memory.

The control apparatus 10 includes a selection unit 11, a determination unit 12 and an allocation unit 13. Components of the control apparatus 10 such as the determination unit 12 and the allocation unit 13 may be software or a module, processing of which is executed by the processor executing the program stored in the memory. Alternatively, the components of the control apparatus 10 may be hardware such as a circuit and a chip.

The selection unit 11 selects a plurality of radio terminals that perform wireless communication with one of a plurality of antennas included in a wireless network at a predetermined timing. The antenna may be an antenna provided at an apparatus having a function of an RU or may be an antenna provided at an apparatus integrally having functions of the RU, a CU and a DU.

The radio terminal may be a terminal that performs communication in complying with wireless communication standards specified in 3rd generation partnership project (3GPP) or a terminal that performs communication in complying with wireless communication standards specified by a standardizing body different from 3GPP. The radio terminal may be, for example, a smartphone terminal, a tablet terminal, an Internet of Things (IoT) terminal, or the like. The IoT terminal may be, for example, a terminal that is attached to an automatic dispenser, an automobile, a home electric appliance apparatus, or the like, and autonomously operates without the need of operation by a user.

The predetermined timing may be a communication timing determined in the wireless communication standards. For example, in 3GPP, radio resources are allocated to radio terminals at 1 transmission time interval (TTI) as a minimum time unit. The plurality of radio terminals are two or more radio terminals for which radio resources are to be allocated. The radio terminals for which radio resources are to be allocated can be read as radio terminals for which scheduling is to be performed.

The determination unit 12 determines combinations of the plurality of antennas and the plurality of radio terminals selected at the selection unit 11. The combinations of the antennas and the radio terminals mean combinations of the radio terminals and antennas with which the radio terminals perform wireless communication. One antenna may perform wireless communication with a plurality of radio terminals or may perform wireless communication with one radio terminal. The radio terminal performs wireless communication with one of the plurality of antennas.

The allocation unit 13 allocates radio resources for performing wireless communication at the predetermined timing, to the plurality of radio terminals selected at the selection unit 11. The radio resources may be, for example, specified using time and a frequency band.

Here, the selection unit 11 determines whether or not a criterion for satisfying service quality determined for data to be transmitted or received by each radio terminal is met for all radio terminals capable of performing wireless communication with one of the plurality of antennas. The selection unit 11 selects a plurality of radio terminals for which the criterion is not met from all the radio terminals. The data to be transmitted or received by the radio terminal may be, for example, a packet or a data packet.

The service quality may be, for example, delay requirements in which a delay period of data is determined. The delay period determined in the delay requirements may be a period from when a sender of an application layer transmits data until when a receiver of the application layer completes reception of the data. Alternatively, the delay period may be a period from when a sender of a wireless layer transmits data until when a receiver of the wireless layer completes reception of the data.

The delay requirements may be determined for each packet or may be determined for each flow including a plurality of packets. The plurality of packets included in the flow may include, for example, identification information indicating that the packets are in the same flow, in headers, or the like. To select a plurality of radio terminals so as to satisfy the delay requirements, for example, radio terminals that transmit data with a short remaining period of the determined delay period may be selected. The allocation unit 13 allocates radio resources to the radio terminals selected at the selection unit 11. Radio resources are not allocated to the radio terminals not selected at the selection unit 11 at a current scheduling timing, and radio resources are allocated at the next or subsequent scheduling timing.

Further, in selection of a plurality of radio terminals for which the criterion for satisfying service quality is not met, radio terminals that transmit or receive data to which a transmission opportunity is not provided for a predetermined period may be selected to provide a transmission opportunity to the data. Alternatively, in selection of a plurality of radio terminals for which the criterion for satisfying service quality is not met, radio terminals that transmit or receive data with a short remaining period of the determined delay period may be selected. By providing transmission opportunities to such radio terminals, it is possible to improve a possibility that all radio terminals satisfy the determined delay requirements.

As described above, the control apparatus 10 determines whether or not the criterion for satisfying service quality determined for data to be transmitted or received by each radio terminal is met for all radio terminals capable of performing wireless communication with one of the plurality of antennas. Further, the control apparatus 10 selects a plurality of radio terminals to which radio resources are to be allocated from all the radio terminals in accordance with the determination result. As a result, by providing transmission opportunities also to radio terminals that transmit or receive data with a short remaining period of the determined delay period or data to which a transmission opportunity is not provided for a predetermined period, it is possible to improve a ratio of data that satisfies the delay requirements. As a result of this, it is possible to prevent quality of a communication service to be executed by a radio terminal from degrading due to a delay period becoming long.

Further, the control apparatus 10 can also reduce load regarding processing of allocating radio resources by selecting radio terminals to which radio resources are to be allocated to reduce the number of radio terminals to which radio resources are to be allocated compared to the number of radio terminals before the selection.

Second Example Embodiment

Figure 2:
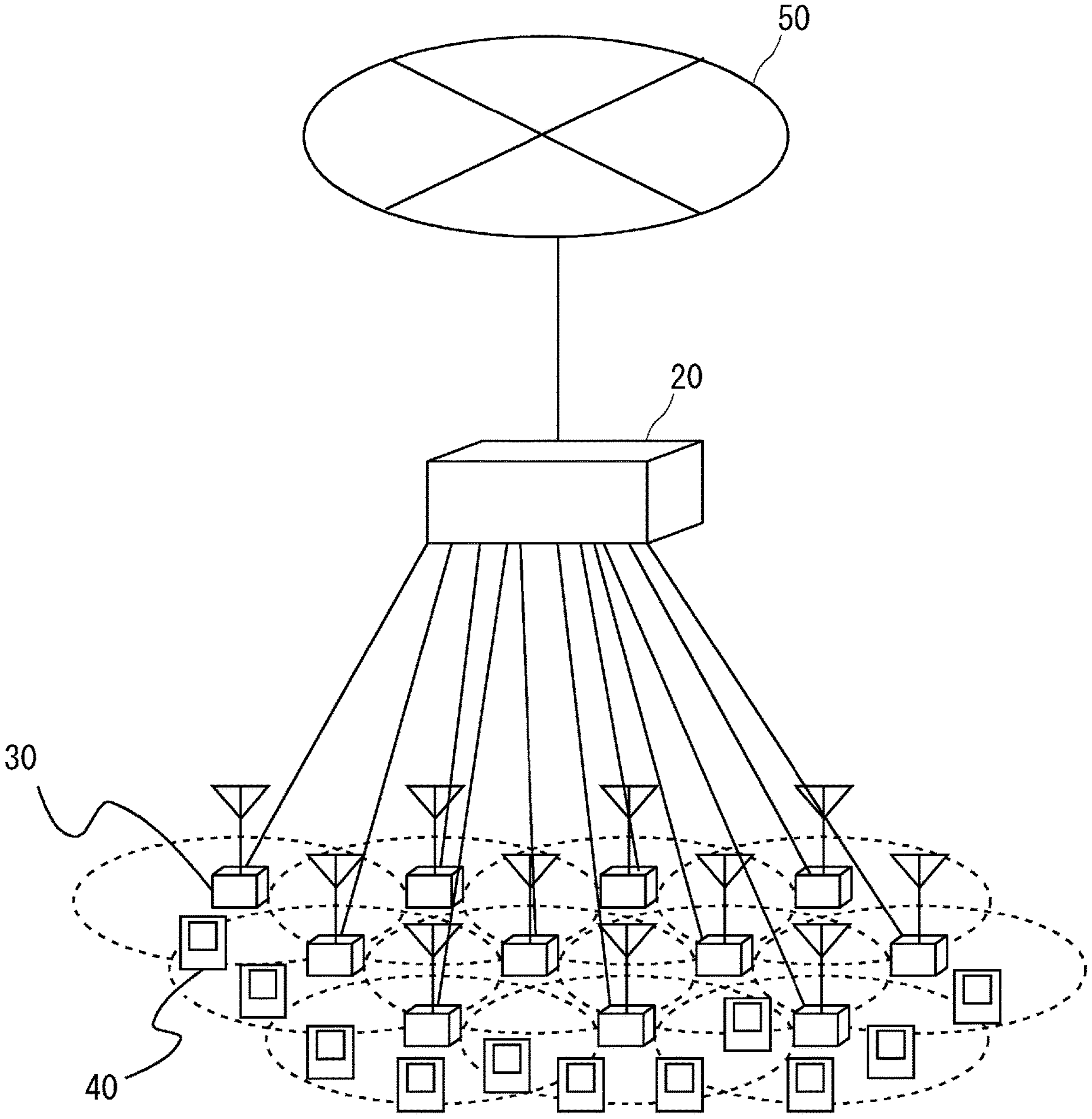
FIG. 2 is a configuration diagram of a communication system according to a second example embodiment.

Subsequently, a configuration example of a communication system according to a second example embodiment will be described using FIG. 2. The communication system in FIG. 2 includes a control apparatus 20, a plurality of antennas 30, a plurality of pieces of user equipment (UE) 40 and a core network 50. While in FIG. 2, a reference numeral is assigned to one antenna or one piece of UE, it is assumed that reference numerals are assigned to other antennas or UE in a similar manner. The UE 40, which is used as a generic name of a communication terminal in 3GPP, may be a smartphone terminal, a tablet terminal, an Internet of Things (IoT) terminal, or the like. The control apparatus 20 has functions of a CU and a DU and controls a plurality of antennas. Further, the control apparatus 20 is connected to a core network apparatus arranged in the core network 50. The antenna 30 has a function of an RU and performs wireless communication with the UE 40. A dotted line in FIG. 2 indicates a communication area of each antenna 30. A plurality of antennas 30 are arranged in high density or densely arranged, and thus, there is an area where communication areas overlap with each other. The UE 40 performs wireless communication with one antenna 30 among the plurality of antennas 30.

Figure 3:
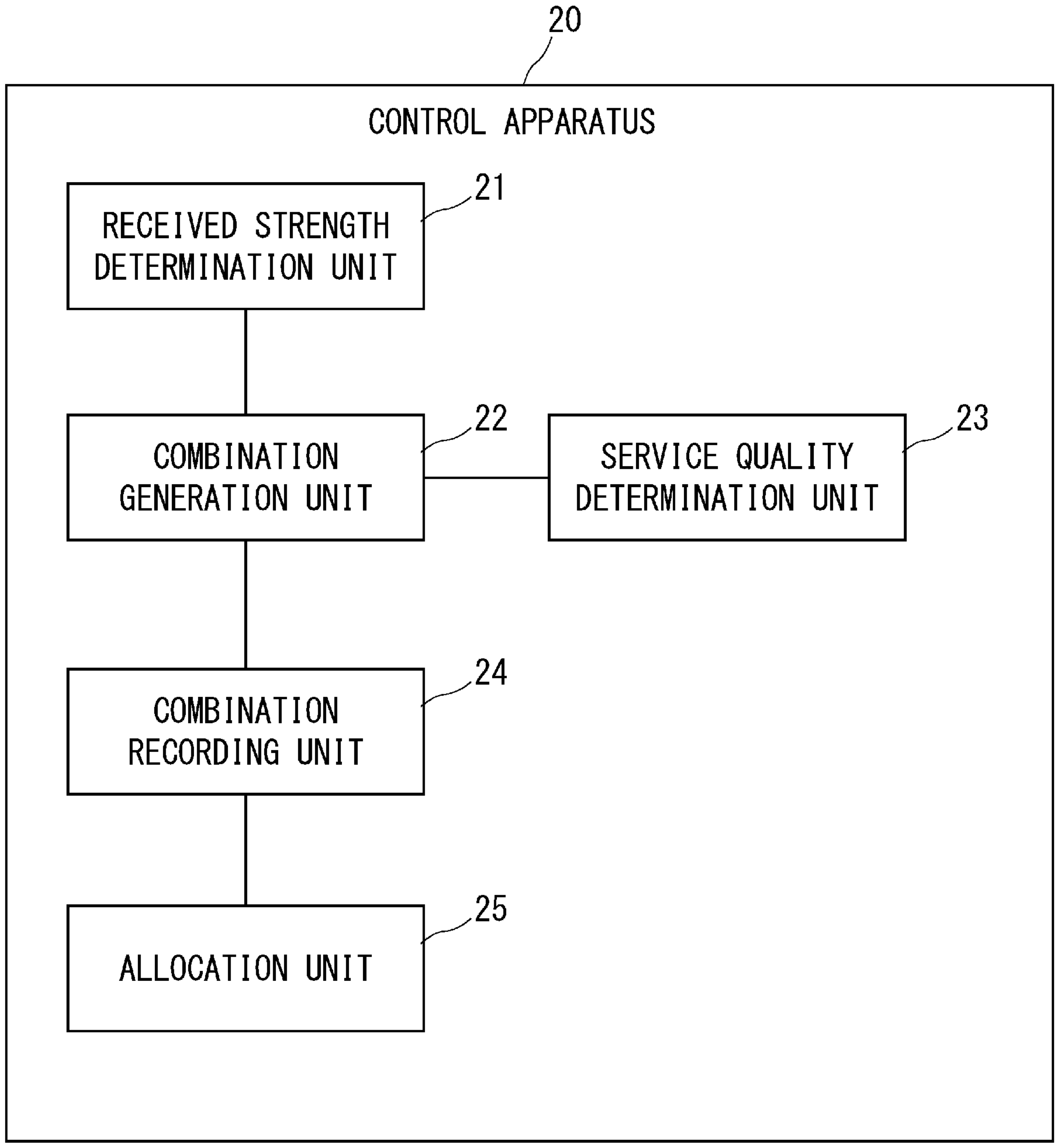
FIG. 3 is a configuration diagram of a control apparatus according to the second example embodiment.

Subsequently, a configuration example of the control apparatus 20 according to the second example embodiment will be described using FIG. 3. The control apparatus 20 includes a received strength determination unit 21, a combination generation unit 22, a service quality determination unit 23, a combination recording unit 24 and an allocation unit 25. Components of the control apparatus 20 may be software or a module, processing of which is executed by the processor executing the program stored in the memory. Alternatively, the components of the control apparatus 20 may be hardware such as a circuit and a chip.

The received strength determination unit 21 determines received strength of a radio wave emitted from the UE 40 at each antenna 30. The radio wave emitted from the UE 40 includes identification information of the UE 40. This enables the received strength determination unit 21 to specify an emission source of the received radio wave. The received strength of the radio wave emitted from the UE 40 may be referred to as received strength of an uplink radio wave. The received strength may read as received power.

Further, the received strength determination unit 21 may determine received strength of a radio wave emitted from the antenna 30 at each piece of UE 40. The received strength of the radio wave emitted from the antenna 30 may be referred to as received strength of a downlink radio wave. The received strength determination unit 21 may regard the received strength of the downlink radio wave as being equal to the received strength of the uplink radio wave. In other words, the received strength determination unit 21 may apply the same value as a value of the received strength of the uplink radio wave, as the received strength of the downlink radio wave.

Alternatively, the UE 40 may transmit a signal including received strength of a radio wave received for each antenna to the control apparatus 20 via the antenna 30. The radio wave emitted from the antenna 30 includes identification information of the antenna 30. This enables the UE 40 to specify the antenna that is an emission source of the received radio wave. In this case, the received strength determination unit 21 may determine received strength of a radio wave for each antenna received by the UE 40 by receiving the signal transmitted from the UE 40 via one of the antennas 30.

The service quality determination unit 23 generates information related to service quality of a communication service to be provided to each piece of UE 40. For example, the service quality determination unit 23 generates a remaining period of an allowable delay determined for a flow regarding each piece of UE 40. The flow regarding the UE 40 may be, for example, associated with an application to be utilized by the UE 40. The allowable delay is a delay period that should be satisfied in the flow. The allowable delay may be, for example, determined in advance by an application.

The allowable delay may be referred to as a deadline or a transmission deadline. The allowable delay means a deadline by which transmission of a plurality of data packets included in a flow of one time should be completed. The allowable delay can be also referred to as a transmission deadline. Alternatively, the allowable delay can be also referred to as a maximum transmission delay allowed by an application. The allowable delay can be defined in various manners. For example, the allowable delay may indicate a deadline of completion of transmission by the sender of the application layer. Alternatively, the allowable delay may indicate a deadline of completion of transmission by the sender of the wireless layer. Alternatively, the allowable delay may indicate a deadline of completion of reception by the receiver of the application layer. Alternatively, the allowable delay may indicate a deadline of completion of reception by the receiver of the wireless layer. Alternatively, the allowable delay may indicate a deadline from when the sender of the application layer starts transmission of a first data packet regarding a flow of one time until when the receiver of the application layer completes reception of the last data packet regarding the flow of one time. Alternatively, the allowable delay may indicate a deadline from when the sender of the wireless layer starts transmission of the first data packet regarding a flow of one time until when the receiver of the wireless layer completes reception of the last data packet regarding the flow of one time.

The remaining period of the allowable delay may be, for example, a difference between the allowable delay and a current time point. The remaining period of the allowable delay may be a period remaining until untransmitted data packets included in the flow are transmitted. Alternatively, the remaining period of the allowable delay may be a period remaining until the control apparatus 20 or the UE 40 receives untransmitted data packets included in the flow. The service quality determination unit 23 may receive information regarding the allowable delay associated with the flow to be transmitted or received by the UE 40 from the core network apparatus in the core network 50, an application server, or the like. The application server may be arranged inside the core network 50 or outside the core network 50.

The service quality determination unit 23 generates the remaining period of the allowable delay regarding the flow to be transmitted by the control apparatus 20 to the UE 40 via the antenna 30. Alternatively, the service quality determination unit 23 generates the remaining period of the allowable delay regarding the flow to be transmitted by the UE 40 to the control apparatus 20 via the antenna 30. The service quality determination unit 23 generates the remaining period of the allowable delay for each piece of UE 40 related to the flow.

The combination generation unit 22 selects the UE 40 for which scheduling is to be performed based on the information generated at the service quality determination unit 23. For example, the combination generation unit 22 may select the UE 40 that transmits or receives a flow for which the remaining period of the allowable delay is shorter than a threshold. Alternatively, the combination generation unit 22 may select the UE 40 of the number of pieces determined in advance in ascending order of the remaining period of the allowable delay. Alternatively, the combination generation unit 22 may select the UE 40 of the same number of pieces as the number of antennas in ascending order of the remaining period of the allowable delay. Alternatively, in a case where one antenna performs wireless communication with a plurality of pieces of UE 40, the combination generation unit 22 may select the UE 40 of the number of pieces obtained by adding a predetermined number to the number of antennas.

The combination generation unit 22 generates combinations of the antennas 30 and the selected UE 40 using information regarding the received strength determined at the received strength determination unit 21.

The combination recording unit 24 records the combinations of the antennas 30 and the UE 40 generated at the combination generation unit 22.

The allocation unit 25 allocates radio resources to the UE 40 using the combinations of the antennas 30 and the UE 40 recorded in the combination recording unit 24.

Figure 4:
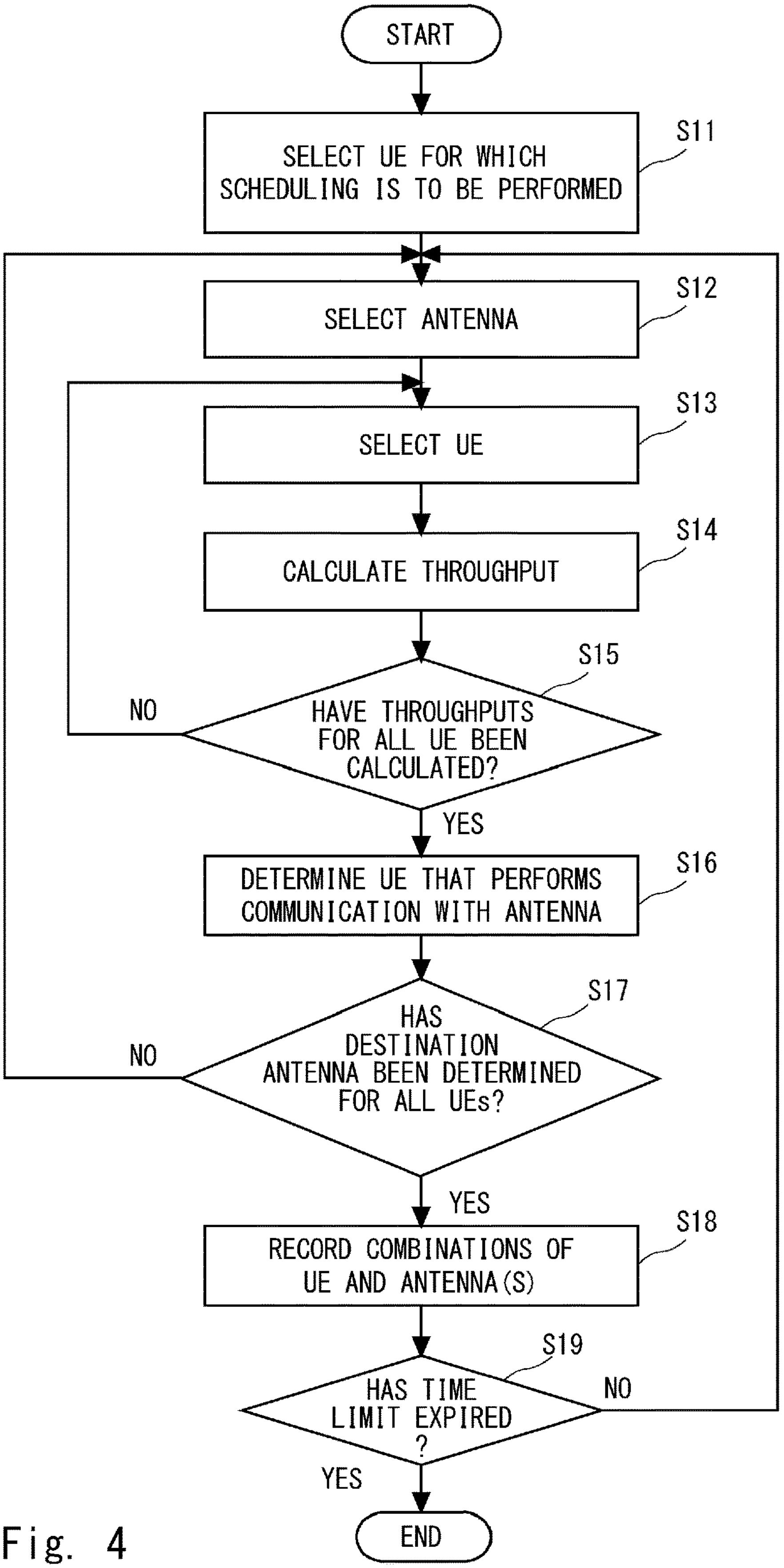
FIG. 4 is a view illustrating flow of processing of generating combinations of antennas and UE according to the second example embodiment.

Here, flow of processing of generating combinations of the antennas 30 and the UE 40 according to the second example embodiment will be described using FIG. 4. In FIG. 4, processing in a case where the number of pieces of UE for which scheduling is to be performed is the same as the number of antennas or the number of pieces of UE for which scheduling is to be performed is smaller than the number of antennas will be described.

First, the combination generation unit 22 selects the UE 40 for which scheduling is to be performed based on the determination result at the service quality determination unit 23 (S11). Here, selection of the UE 40 for which scheduling is to be performed will be described using FIG. 5.

Figure 5:
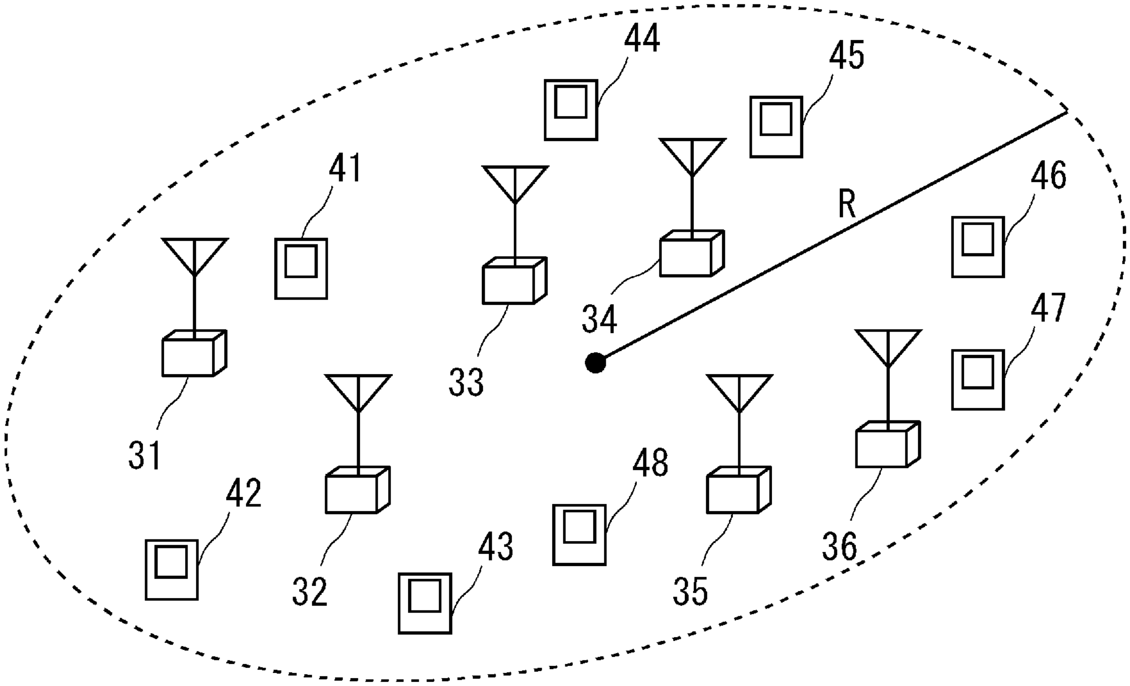
FIG. 5 is a view for explaining selection of UE for which scheduling is to be performed according to the second example embodiment.

FIG. 5 illustrates a state where antennas 31 to 36 and UE 41 to UE 48 exist within an area having a radius R (R is a positive real number). The UE 41 performs wireless communication with one of the antennas 31 to 36. The UE 42 to the UE 48 also perform wireless communication with one of the antennas 31 to 36 in a similar manner to the UE 41. Further, while FIG. 5 illustrates the area where the antennas and the UE exist as a circle, a shape of the area is not limited to the circle.

The combination generation unit 22 selects UE that performs wireless communication with the antenna existing in a predetermined area illustrated in FIG. 5. It is assumed, for example, that a remaining period of an allowable delay of a flow regarding the UE 41 to the UE 43 is shorter than the threshold, and a remaining period of an allowable delay of a flow regarding the UE 44 to the UE 48 is longer than the threshold. In this case, the combination generation unit 22 selects three pieces of UE of the UE 41 to the UE 43.

Returning to FIG. 4, next, the combination generation unit 22 selects an arbitrary antenna from the antennas 31 to 36 (S12). For example, the combination generation unit 22 selects the antenna 31. Then, the combination generation unit 22 selects arbitrary UE from the UE for which scheduling is to be performed among the UE 41 to UE 43 (S13). For example, the combination generation unit 22 selects the UE 41.

Then, the combination generation unit 22 calculates a throughput when the antenna 31 and the UE 41 perform wireless communication (S14). Here, an example will be described where the combination generation unit 22 calculates a throughput regarding uplink communication. The combination generation unit 22 calculates the throughput using the following expression 1.

$$\text{Throughput} = \sum_{m=1}^{M} \frac{W}{M} \log_2(1 + SINR_m) \quad \text{(Expression 1)}$$

A signal to interference and noise ratio (SINR) indicates a ratio of interference and noise with respect to a signal. Further, M indicates the number of pieces of UE selected as the UE for which scheduling is to be performed −1, and W indicates a bandwidth allocated to the UE. For example, the SINR may be a ratio of received power of a radio wave emitted from the UE with respect to a sum of interference power and noise. It is assumed that the antenna 31 is selected in step S12, and the UE 41 is selected in step S13. In this case, for the antenna 31, the radio wave emitted from the UE 41 is a desired wave, and the radio wave emitted from the UE 42 and the UE 43 is an interference wave. The desired wave may be referred to as a desired wave. Specifically, an SINR in a case where the radio wave emitted from the UE 42 is set as the interference wave is set as an $SINR_1$, and an SINR in a case where the radio wave emitted from the UE 43 is set as the interference wave is set as an $SINR_2$.

Figure 6:
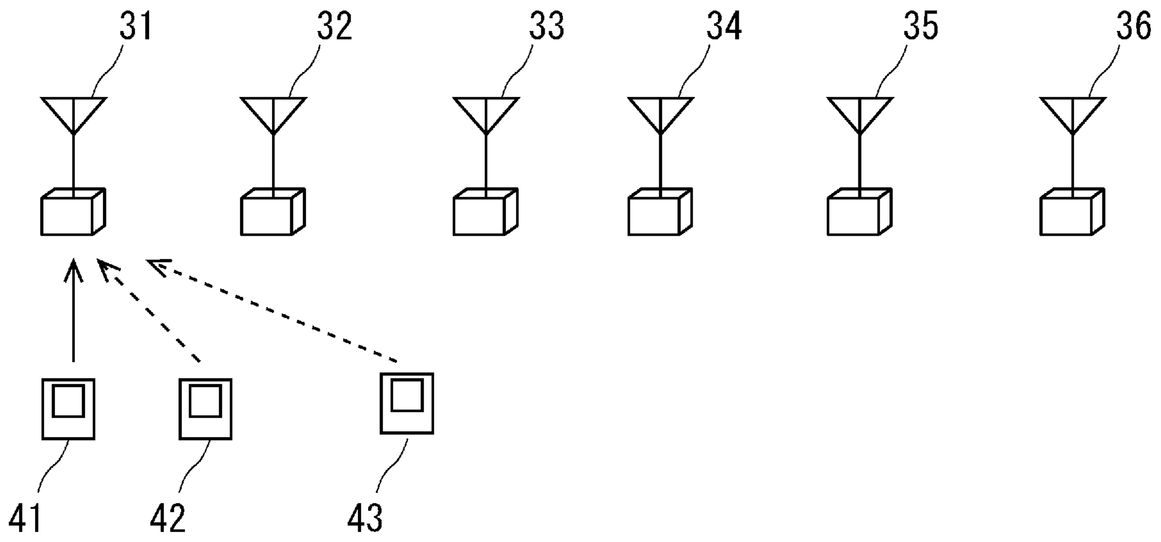
FIG. 6 is a view illustrating a desired wave and an interference wave in a case where the antenna according to the second example embodiment selects UE.

FIG. 6 illustrates the desired wave and the interference wave in a case where the antenna 31 selects the UE 41. FIG. 6 illustrates a state where each of the UE 41 to the UE 43 emits a radio wave to the antenna 31. A solid arrow indicates the desired wave, and a dotted arrow indicates the interference wave. In this manner, in a case where the antenna 31 selects the UE 41, the antenna 31 receives interference waves from the UE 42 and the UE 43. More specifically, the UE 42 and the UE 43 also perform wireless communication with other antennas different from the antenna 31. In this case, radio waves emitted by the UE 42 and the UE 43 to perform wireless communication with other antennas are dealt with as interference waves for the UE 41.

The combination generation unit 22 substitutes the $SINR_1$ and the $SINR_2$ in the expression 1 to calculate a throughput in a case where the UE 41 is selected. As received power of the radio waves emitted from the UE at the control apparatus 20, values determined at the received strength determination unit 21 are used.

Returning to FIG. 4, next, the combination generation unit 22 determines whether or not throughputs of all the UE selected as the UE for which scheduling is to be performed have been calculated (S15). Here, the combination generation unit 22 repeats processing in step S13 and subsequent processing because throughputs in a case where the UE 42 and the UE 43 are selected are not calculated. The combination generation unit 22, for example, selects the UE 42 in step S13 and calculates a throughput when the UE 42 and the antenna 31 perform wireless communication in step S14.

Such processing is repeated, and in a case where throughputs are calculated for all the UE for which scheduling is to be performed, the combination generation unit 22 determines UE that performs wireless communication with the antenna 31 (S16). The combination generation unit 22 determines UE for which a value of the throughput is maximum as the UE that performs wireless communication with the antenna 31.

Then, the combination generation unit 22 determines whether or not destination antenna has been determined for all the UE for which scheduling is to be performed (S17). In a case where the combination generation unit 22 determines that destination antenna has not been determined for all the UE, the processing in step S12 and subsequent processing are repeated. The combination generation unit 22 selects in step S12, for example, the antenna 32 that is different from the antenna 31 that has already been selected and executes the processing in step S13 and subsequent processing. Here, in step S13, UE other than the UE 41 that has already been determined as the UE that performs wireless communication with the antenna 31 is selected. In other words, in step S13, UE other than the UE that has already been determined as UE that performs wireless communication with other antennas is selected.

Figure 7:
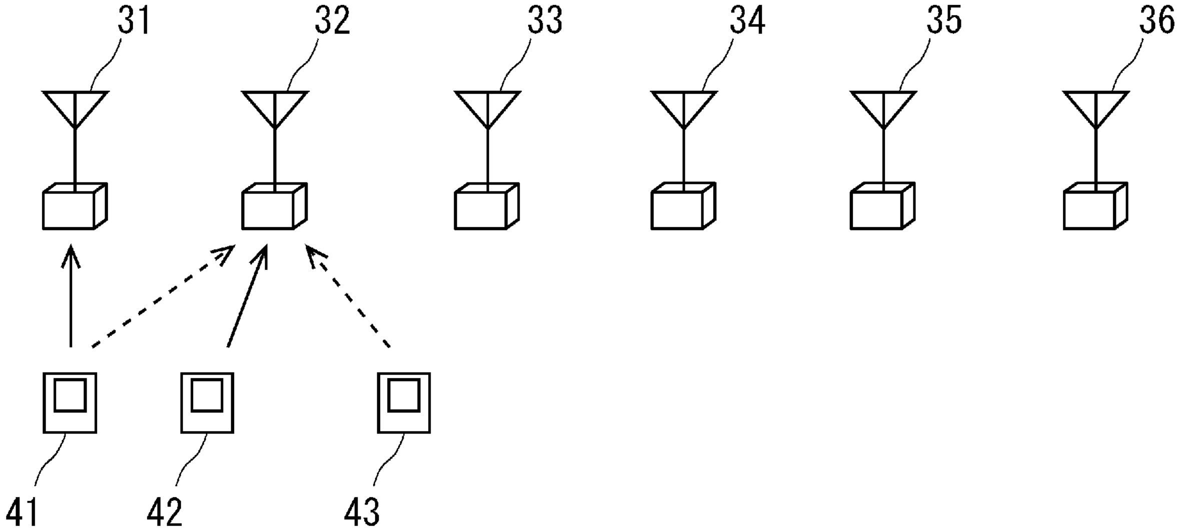
FIG. 7 is a view illustrating a desired wave and an interference wave in a case where the antenna according to the second example embodiment selects UE.

FIG. 7 illustrates a desired wave and an interference wave in a case where the antenna 32 selects the UE 42. The antenna 31 is determined as a communication destination of the UE 41. Thus, the antenna 32 regards a radio wave emitted from the UE 41 as an interference wave. In this manner, the antenna 32 receives interference waves from the UE 41 and the UE 43 and receives a desired wave from the UE 42.

Returning to FIG. 4, in a case where the combination generation unit 22 determines that destination antenna has been determined for all UE for which scheduling is to be performed in step S17, the combination generation unit 22 records combinations of the antenna(s) and the UE (S18).

Then, the combination generation unit 22 determines whether or not a time limit regarding processing of searching for an optimal combination of the antenna and the UE has expired. Here, the time limit may be, for example, a period until the antenna and the UE in the combination actually start wireless communication. In a case where the combination generation unit 22 determines that the time limit has expired, the processing ends. In this case, the allocation unit 25 allocates radio resources to the UE based on the combinations of the antennas and the UE recorded in step S18.

In a case where the combination generation unit 22 determines that the time limit has not expired, the processing in step S12 and subsequent processing are repeated. In this case, for example, the combination generation unit 22 selects antennas in the order different from the order of the antennas selected in step S12 in a case where the processing in step S12 and subsequent processing are repeatedly performed so far. This makes it possible to generate a combination different from the combinations of the antennas and the UE recorded in step S18 so far. The combination generation unit 22 may employ a combination with a larger throughput in the whole system by comparing a combination of the antenna and the UE recorded in step S18 first and a combination of the antenna and the UE recorded in step S18 next.

While in FIG. 4, the control apparatus 20 calculates uplink throughputs to determine the antenna 30 that performs wireless communication with the UE 40, downlink throughputs may be calculated to determine the antenna 30 that performs wireless communication with the UE 40. In this case, the UE 40 selected in step S13 regards a radio wave emitted from the antenna selected in step S12 as a desired wave and regards radio waves emitted from other antennas as interference waves.

Figure 8:
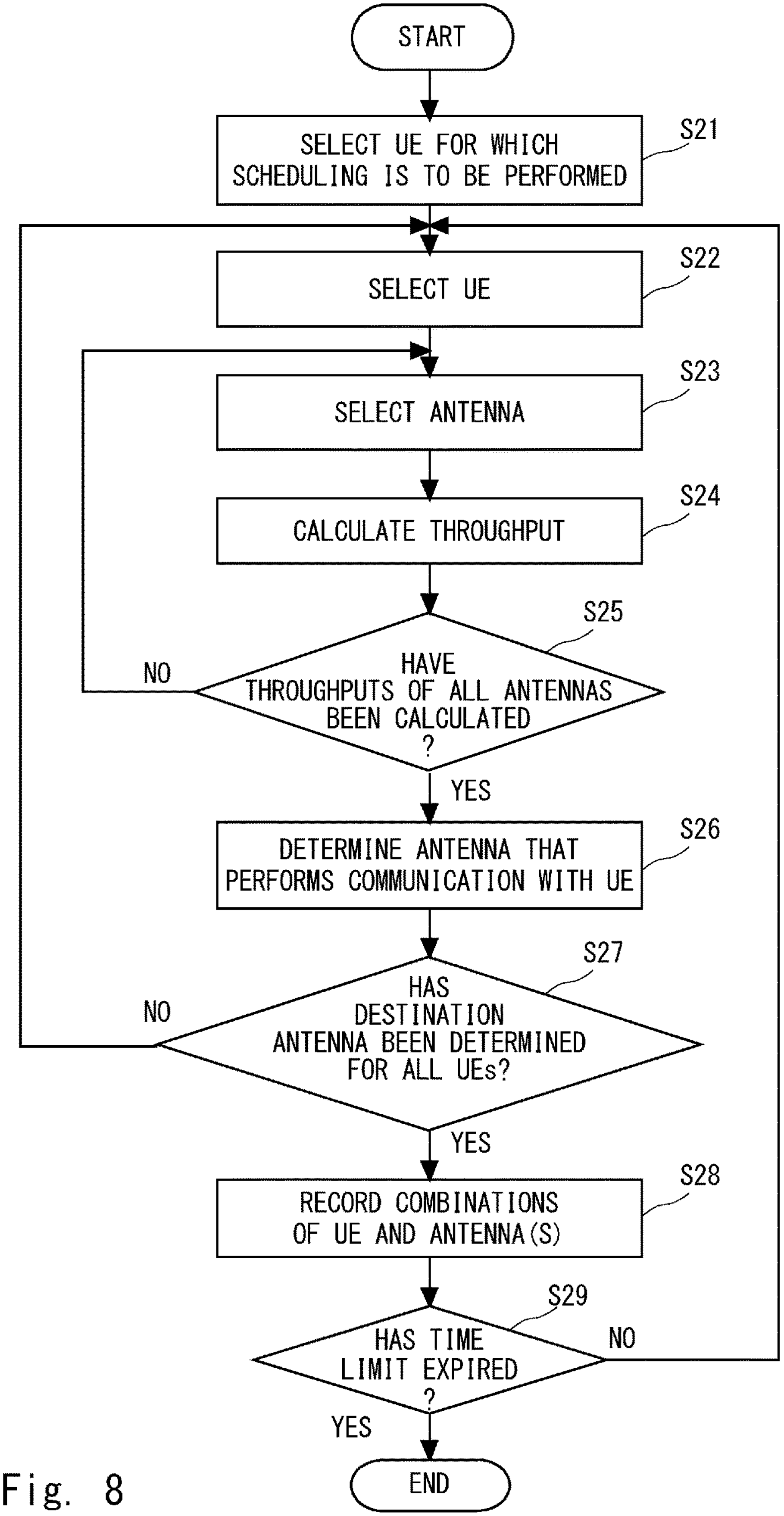
FIG. 8 is a view illustrating flow of processing of generating combinations of antennas and UE according to the second example embodiment.

Subsequently, flow of processing of generating a combination of the antenna 30 and the UE 40 according to the second example embodiment, different from FIG. 4 will be described using FIG. 8. In FIG. 8, processing in a case where the number of pieces of UE for which scheduling is to be performed is larger than the number of antennas will be described.

In step S21, processing similar to the processing in step S11 in FIG. 4 is executed, and it is assumed, for example, that the UE 41 to the UE 47 are selected. Then, the combination generation unit 22 selects arbitrary UE among the UE 41 to the UE 47 for which scheduling is to be performed (S22). For example, the combination generation unit 22 selects the UE 41. Then, the combination generation unit 22 selects an arbitrary antenna among the antennas 31 to 36 (S23). For example, the combination generation unit 22 selects the antenna 31.

The processing in step S24 is similar to the processing in step S14 in FIG. 4, and thus, description will be omitted. Then, the combination generation unit 22 determines whether or not throughputs between the UE 41 and all the antennas 31 to 36 have been calculated (S25). In a case where there is an antenna for which a throughput with the UE 41 is not calculated among the antennas 31 to 36, the combination generation unit 22 repeats the processing in step S23 and subsequent processing. The combination generation unit 22 selects, for example, the antenna 32 in step S23 that is to be executed again.

As a result of such processing being repeated, in a case where throughputs between the UE selected in step S22 and all the antennas are calculated, the combination generation unit 22 determines the antenna that performs wireless communication with the UE 41 (S26). The combination generation unit 22 determines an antenna for which a value of the throughput is maximum as the antenna that performs wireless communication with the UE 41.

Then, the combination generation unit 22 determines whether or not destination antenna has been determined for all the UE for which scheduling is to be performed (S27). In a case where a combination determination unit determines that the destination antenna has not been determined for all the UE, the processing in step S22 and subsequent processing are repeated. The combination generation unit 22 selects in step S22, for example, the UE 42 different from the UE 41 that has already been selected and executes the processing in step S23 and subsequent processing. Here, in step S25, the combination generation unit 22 determines whether or not throughputs between the UE 42 and all the antennas including the antenna determined as the antenna that is the communication destination of the UE 41 have been calculated.

Processing in step S28 and S29 after the combination determination unit determines that the destination antenna has been determined for all the UE is similar to the processing in step S18 and S19 in FIG. 4, and thus, detailed description will be omitted.

As described in FIG. 8, in a case where the number of pieces of UE for which scheduling is to be performed is larger than the number of antennas, one antenna requires to perform wireless communication with a plurality of pieces of UE. Thus, in step S23 to S25, throughputs between all the antennas including the antenna determined in step S26 and the UE selected in step S22 are calculated. As a result of this, there is also a case where the antenna that is the same as the antenna determined in the previous step S26 is determined again in step S26 that is repeatedly executed. In this manner, by generating combinations of the antennas and the UE so that one antenna can perform wireless communication with a plurality of pieces of UE, even in a case where the number of pieces of UE for which scheduling is to be performed is larger than the number of antennas, an optimal combination can be generated.

Also in a case where the number of pieces of UE for which scheduling is to be performed is the same as the number of antennas or the number of pieces of UE for which scheduling is to be performed is smaller than the number of antennas, in a case where it is allowed that one antenna performs wireless communication with a plurality of pieces of UE, the processing in FIG. 8 may be executed.

Further, in step S11 in FIG. 4, after selecting the UE for which scheduling is to be performed, the control apparatus 20 may determine whether or not the number of pieces of the selected UE is larger than the number of antennas. In a case where the number of pieces of the selected UE is smaller than or the same as the number of antennas, the control apparatus 20 may execute the processing in step S12 and subsequent processing in FIG. 4, and in a case where the number of pieces of the selected UE is larger than the number of antennas, the control apparatus 20 may execute the processing in step S22 and subsequent processing in FIG. 8.

As described above, use of the control apparatus 20 according to the second example embodiment makes it possible to select UE for which scheduling is to be performed in accordance with a period from current time to an allowable delay. This can reduce the number of pieces of UE for which scheduling is to be performed compared to a case where scheduling is to be performed for all the UE in the area. As a result of this, it is possible to also reduce load regarding processing of allocating radio resources in the control apparatus 20.

Further, UE regrading a flow with a short period from the current time to the allowable delay is preferentially selected as the UE for which scheduling is to be performed. This can increase UE that completes transmission or reception of all data packets in the flow within the allowable delay, so that it is possible to prevent degradation of quality of a communication service to be executed by the UE.

Third Example Embodiment

Subsequently, processing details of the control apparatus 20 according to a third example embodiment will be described. A configuration example of the control apparatus 20 is indicated using FIG. 3 in a similar manner to the second example embodiment.

In the second example embodiment, a case has been described where the service quality determination unit 23 generates a remaining period of the allowable delay determined for the flow regarding each piece of UE 40. In the third example embodiment, the service quality determination unit 23 generates information regarding a usage condition of a buffer. The buffer is set at a memory, or the like, provided at the control apparatus 20. Further, the buffer is set for each piece of UE 40. A data packet to be transmitted to each piece of UE 40 via the antenna 30 is temporarily stored in the buffer. The data packet stored in the buffer is transmitted to the UE 40 when a scheduled transmission opportunity is provided.

Here, the service quality determination unit 23 generates a staying period during which the data packet stored in the buffer stays in the buffer. For example, the data packet is provided with a time stamp at a time point at which the data packet is stored in the buffer or a time point at which the data packet is received at the control apparatus 20. Thus, by calculating a difference between a time stamp indicating current time and the time stamp provided to the data packet, it is possible to generate the staying period of the data packet in the buffer.

Further, the combination generation unit 22 selects the UE 40 that receives a data packet for which the staying period in the buffer exceeds a threshold as the UE for which scheduling is to be performed. The threshold may be, for example, determined based on a maximum period during which the data packed can stay in the buffer to satisfy the allowable delay. For example, the threshold may be a value obtained by subtracting a predetermined value from the maximum period during which the data packet can stay in the buffer. A transmission opportunity is not provided for a fixed period to the data packet for which the staying period in the buffer exceeds the threshold, and there is a possibility that the allowable delay determined for the flow regarding the UE 40 may be exceeded. Thus, by selecting the UE 40 that receives a data packet for which the staying period in the buffer exceeds the threshold as the UE for which scheduling is to be performed, it is possible to increase a possibility of the data packet being received at the UE 40 within the allowable delay.

The combination generation unit 22 may select data packets of a predetermined number in descending order of the staying period in the buffer and may select the UE 40 that receives the selected data packets as the UE for which scheduling is to be performed.

Alternatively, the service quality determination unit 23 may generate information regarding a data amount of the data packets stored in the buffer. The data amount of the data packets stored in the buffer may be, for example, indicated using a length of a queue. In this case, the combination generation unit 22 may select the UE 40 that receives data packets with a length of a queue exceeding a threshold as the UE for which scheduling is to be performed. The threshold may be, for example, determined based on a maximum data amount of data packets that can be stored in the buffer to satisfy the allowable delay. For example, the threshold may be a value obtained by subtracting a predetermined value from the length of the queue constituting the maximum data packets that can be stored in the buffer. Alternatively, the combination generation unit 22 may select lengths of queues of a predetermined number in descending order of the length of the queue and select the UE 40 that receives data packets constituting the selected lengths of queues as the UE for which scheduling is to be performed.

Alternatively, the service quality determination unit 23 may calculate a value by dividing the length of the queue by a value of the remaining period of the allowable delay. The value obtained by dividing the length of the queue by the value of the remaining period of the allowable delay indicates a data amount to be transmitted per unit time until the allowable delay. In this case, the combination generation unit 22 may select the UE 40 that receives the data packet of the length of the queue as the UE for which scheduling is to be performed in a case where the length of the queue/the remaining period of the allowable delay exceeds a threshold. "/" indicates division.

As described above, as a result of the UE for which scheduling is to be performed being selected in accordance with a usage condition of the buffer set for each piece of UE, data to which a transmission opportunity is not provided for a predetermined period can be transmitted to the selected UE. As a result, it is possible to increase a possibility of the data packet being received at the UE 40 within the allowable delay determined for the flow regarding the UE 40. This can increase the UE that completes transmission or reception of all the data packets in the flow within the allowable delay, so that it is possible to prevent degradation of quality of a communication service to be executed by the UE.

Figure 9:
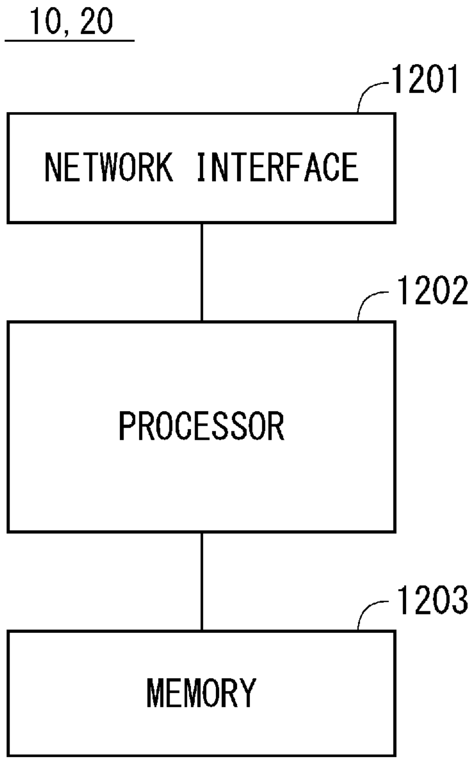
FIG. 9 is a configuration diagram of a control apparatus according to each example embodiment.

FIG. 9 is a block diagram illustrating a configuration example of the control apparatus 10 and the control apparatus 20 (hereinafter, referred to as the control apparatus 10, and the like). Referring to FIG. 9, the control apparatus 10, and the like, include a network interface 1201, a processor 1202 and a memory 1203. The network interface 1201 may be used to perform communication with a network node (e.g., eNB, MME and P-GW). The network interface 1201 may include, for example, a network interface card (NIC) complying with IEEE 802.3 series. Here, eNB represents evolved Node B, MME represents mobility management entity, and P-GW represents a packet data gateway. IEEE represents Institute of Electrical and Electronics Engineers.

The processor 1202 performs processing of the control apparatus 10, and the like, described using the flowchart in the above-described example embodiments by reading out and executing software (computer program) from the memory 1203. The processor 1202 may be, for example, a microprocessor, an MPU or a CPU. The processor 1202 may include a plurality of processors.

The memory 1203 is constituted with a combination of a volatile memory and a non-volatile memory. The memory 1203 may include a storage disposed away from the processor 1202. In this case, the processor 1202 may access the memory 1203 via an input/output (I/O) interface (not illustrated).

In the example in FIG. 9, the memory 1203 is used to store software modules. The processor 1202 can perform processing of the control apparatus 10, and the like, described in the above-described example embodiments by reading out and executing the software modules from the memory 1203.

As described using FIG. 9, each of the processors provided at the control apparatus 10, and the like, in the above-described example embodiments executes one or a plurality of programs including commands for causing a computer to perform an algorithm described using the drawings.

In the above-described example, the program is stored using various types of non-transitory computer readable media and can be supplied to the computer. The non-transitory computer readable media include various types of tangible storage media. Examples of the non-transitory computer readable media include a magnetic recording medium (for example, a flexible disk, a magnetic tape and a hard disk drive), a magnetooptical recording medium (for example, an magnetooptical disk), a CD-read only memory (ROM), a CD-R, a CD-R/W, and a semiconductor memory (for example, a mask ROM, a programmable ROM (PROM), an erasable PROM (EPROM), a flash ROM and a random access memory (RAM)). Further, the program may be supplied to the computer using various types of transitory computer readable media. Examples of the transitory computer readable media include an electrical signal, an optical signal and an electromagnetic wave. The transitory computer readable media can supply the program to the computer via a wired communication path such as an electric wire and an optical fiber or a wireless communication path.

Note that the present disclosure is not limited to the above-described example embodiments and can be changed as appropriate within the scope not deviating from the gist.

While part or all of the above-described example embodiments can be described as in the following supplementary note, the present disclosure is not limited to the following.

(Supplementary Note 1)

A control apparatus including:

a selection unit configured to select a plurality of radio terminals that perform wireless communication through one of a plurality of antennas included in a wireless network at a predetermined timing;

a determination unit configured to determine combinations of the plurality of antennas and the selected plurality of radio terminals; and an allocation unit configured to allocate radio resources for performing wireless communication at the predetermined timing, to the plurality of radio terminals, in which the selection unit determines whether or not a criterion for satisfying service quality determined for data to be transmitted or received by each radio terminal is met for all radio terminals capable of performing wireless communication through one of the plurality of antennas and selects the plurality of radio terminals for which the criterion is not met from all the radio terminals.

(Supplementary Note 2)

The control apparatus according to supplementary note 1, in which the selection unit selects the radio terminals of the same number as the number of the antennas included in a predetermined area or the radio terminals of the number smaller than the number of the antennas included in the predetermined area.

(Supplementary Note 3)

The control apparatus according to supplementary note 1, in which the selection unit selects the radio terminals of the number larger than the number of the antennas included in a predetermined area.

(Supplementary Note 4)

The control apparatus according to any one of supplementary note 1 to 3, in which the selection unit selects the plurality of radio terminals using a remaining period of an allowable delay determined for data to be transmitted or received by the radio terminals.

(Supplementary Note 5)

The control apparatus according to any one of supplementary note 1 to 3, in which the selection unit selects the plurality of radio terminals in accordance with a usage condition of a buffer for each of the radio terminals.

(Supplementary Note 6)

The control apparatus according to supplementary note 5, in which the selection unit selects a radio terminal associated with the buffer having a packet staying for a period longer than a predetermined period.

(Supplementary Note 7)

The control apparatus according to supplementary note 5, in which the selection unit divides a stored data amount by a remaining period of an allowable delay determined for data stored in the buffer and selects a radio terminal associated with a buffer for which a division result exceeds a threshold.

(Supplementary Note 8)

A communication system comprising:

a plurality of antennas included in a wireless network; and a control apparatus configured to select a plurality of radio terminals that perform wireless communication through one of the plurality of antennas at a predetermined timing, determine combinations of the plurality of antennas and the selected plurality of radio terminals and allocate radio resources for performing wireless communication at the predetermined timing, to the plurality of radio terminals, in which the control apparatus determines whether or not a criterion for satisfying service quality determined for data to be transmitted or received by each radio terminal is met for all radio terminals capable of performing wireless communication through one of the plurality of antennas and selects the plurality of radio terminals for which the criterion is not met from all the radio terminals.

(Supplementary Note 9)

The communication system according to supplementary note 8, in which the control apparatus selects the radio terminals of the same number as the number of the antennas included in a predetermined area or the radio terminals of the number smaller than the number of the antennas included in the predetermined area.

(Supplementary Note 10)

The communication system according to supplementary note 8, in which the control apparatus selects the radio terminals of the number larger than the number of the antennas included in a predetermined area.

(Supplementary Note 11)

A control method comprising:

selecting a plurality of radio terminals that perform wireless communication through one of a plurality of antennas included in a wireless network at a predetermined timing;

determining combinations of the plurality of antennas and the selected plurality of radio terminals;

allocating radio resources for performing wireless communication at the predetermined timing, to the plurality of radio terminals; and when selecting the radio terminals, determining whether or not a criterion for satisfying service quality determined for data to be transmitted or received by each radio terminal is met for all radio terminals capable of performing wireless communication through one of the plurality of antennas and selecting the plurality of radio terminals for which the criterion is not met from all the radio terminals.

(Supplementary Note 12)

A program for causing a computer to execute:

selecting a plurality of radio terminals that perform wireless communication through one of a plurality of antennas included in a wireless network at a predetermined timing;

determining combinations of the plurality of antennas and the selected plurality of radio terminals;

allocating radio resources for performing wireless communication at the predetermined timing, to the plurality of radio terminals; and when selecting the radio terminals, determining whether or not a criterion for satisfying service quality determined for data to be transmitted or received by each radio terminal is met for all radio terminals capable of performing wireless communication through one of the plurality of antennas and selecting the plurality of radio terminals for which the criterion is not met from all the radio terminals.

REFERENCE SIGNS LIST

10 CONTROL APPARATUS
11 SELECTION UNIT
12 DETERMINATION UNIT
13 ALLOCATION UNIT
20 CONTROL APPARATUS
21 RECEIVED STRENGTH DETERMINATION UNIT
22 COMBINATION GENERATION UNIT
23 SERVICE QUALITY DETERMINATION UNIT
24 COMBINATION RECORDING UNIT
25 ALLOCATION UNIT
30 ANTENNA
31 ANTENNA
32 ANTENNA
33 ANTENNA
34 ANTENNA

35 ANTENNA
36 ANTENNA
40 UE
41 UE
42 UE
43 UE
44 UE
45 UE
46 UE
47 UE
48 UE
50 CORE NETWORK

What is claimed is:

1. A control apparatus comprising:
at least one memory storing instructions, and
at least one processor configured to execute the instructions to;
select a plurality of radio terminals that perform wireless communication through one of a plurality of antennas included in a wireless network at a predetermined timing;
determine combinations of the plurality of antennas and the selected plurality of radio terminals; allocate radio resources for performing wireless communication at the predetermined timing, to the plurality of radio terminals;
determine whether or not a criterion for satisfying service quality determined for data to be transmitted or received by each radio terminal is met for all radio terminals capable of performing wireless communication through one of the plurality of antennas; and
select the plurality of radio terminals for which the criterion is not met from all the radio terminals, wherein
in a case where the number of the selected radio terminals is the same number as the number of the antennas included in a predetermined area or smaller than the number of the antennas included in the predetermined area,
the at least one processor configured to execute the instructions to:
calculate a throughput between first antenna among the plurality of antennas included in the predetermined area and each of the selected plurality of antennas;
determine combinations of the first antenna and first radio terminal for which a value of the throughput is maximum;
calculate a throughput between second antenna other than the first antenna among the plurality of antennas included in the predetermined area and each of the selected plurality of antennas; and
determine combinations of the second antenna and second radio terminal for which a value of the throughput is maximum; and
in a case where the number of the selected radio terminals is larger than the number of the antennas included in the predetermined area,
the at least one processor configured to execute the instructions to:
calculate a throughput between third radio terminal among the selected plurality of antennas and each of the plurality of antennas included in the predetermined area;
determine combinations of the third radio terminal and antenna for which a value of the throughput is maximum;
calculate a throughput between fourth radio terminal among the selected plurality of radio terminals and each of the plurality of antennas included in the predetermined area; and
determine combinations of the fourth radio terminal and antenna for which a value of the throughput is maximum.

2. The control apparatus according to claim 1,
wherein the at least one processor is further configured to execute the instructions to select the radio terminals of the same number as the number of the antennas included in a predetermined area or the radio terminals of the number smaller than the number of the antennas included in the predetermined area.

3. The control apparatus according to claim 1,
wherein the at least one processor is further configured to execute the instructions to select the radio terminals of the number larger than the number of the antennas included in a predetermined area.

4. The control apparatus according to claim 1, wherein
an allowable delay is determined for data to be transmitted or received by the radio terminals, and
the at least one processor is further configured to execute the instructions to select the plurality of radio terminals that transmit or receive data for which a remaining period of the allowable delay is shorter than a predetermined period.

5. The control apparatus according to claim 1,
wherein the at least one processor is further configured to execute the instructions to select the plurality of radio terminals in accordance with a usage condition of a buffer for each of the radio terminals.

6. The control apparatus according to claim 5,
wherein the at least one processor is further configured to execute the instructions to select a radio terminal associated with the buffer having a packet staying for a period longer than a predetermined period.

7. The control apparatus according to claim 5,
wherein the at least one processor is further configured to execute the instructions to divide a stored data amount by a remaining period of an allowable delay determined for data stored in the buffer and selects a radio terminal associated with a buffer for which a division result exceeds a threshold.

8. A control method comprising:
selecting a plurality of radio terminals that perform wireless communication through one of a plurality of antennas included in a wireless network at a predetermined timing;
determining combinations of the plurality of antennas and the selected plurality of radio terminals;
allocating radio resources for performing wireless communication at the predetermined timing, to the plurality of radio terminals; and
when selecting the radio terminals,
determining whether or not a criterion for satisfying service quality determined for data to be transmitted or received by each radio terminal is met for all radio terminals capable of performing wireless communication through one of the plurality of antennas and selecting the plurality of radio terminals for which the criterion is not met from all the radio terminals,
when determining combinations of the plurality of antennas and the selected plurality of radio terminal,
in a case where the number of the selected radio terminals is the same number as the number of the antennas included in a predetermined area or smaller than the number of the antennas included in the predetermined area, calculating a throughput between first antenna among the plurality of antennas included in the predetermined area and each of the selected plurality of antennas;

determining combinations of the first antenna and first radio terminal for which a value of the throughput is maximum;

calculating a throughput between second antenna other than the first antenna among the plurality of antennas included in the predetermined area and each of the selected plurality of antennas; and determining combinations of the second antenna and second radio terminal for which a value of the throughput is maximum; and in a case where the number of the selected radio terminals is larger than the number of the antennas included in the predetermined area, calculating a throughput between third radio terminal among the selected plurality of antennas and each of the plurality of antennas included in the predetermined area;

determining combinations of the third radio terminal and antenna for which a value of the throughput is maximum;

calculating a throughput between fourth radio terminal among the selected plurality of radio terminals and each of the plurality of antennas included in the predetermined area; and determining combinations of the fourth radio terminal and antenna for which a value of the throughput is maximum.

9. A non-transitory computer readable medium storing a program for causing a computer to execute:

selecting a plurality of radio terminals that perform wireless communication through one of a plurality of antennas included in a wireless network at a predetermined timing;

determining combinations of the plurality of antennas and the selected plurality of radio terminals;

allocating radio resources for performing wireless communication at the predetermined timing, to the plurality of radio terminals; and when selecting the radio terminals, determining whether or not a criterion for satisfying service quality determined for data to be transmitted or received by each radio terminal is met for all radio terminals capable of performing wireless communication through one of the plurality of antennas and selecting the plurality of radio terminals for which the criterion is not met from all the radio terminals, when determining combinations of the plurality of antennas and the selected plurality of radio terminal, in a case where the number of the selected radio terminals is the same number as the number of the antennas included in a predetermined area or smaller than the number of the antennas included in the predetermined area, calculating a throughput between first antenna among the plurality of antennas included in the predetermined area and each of the selected plurality of antennas;

determining combinations of the first antenna and first radio terminal for which a value of the throughput is maximum;

calculating a throughput between second antenna other than the first antenna among the plurality of antennas included in the predetermined area and each of the selected plurality of antennas; and determining combinations of the second antenna and second radio terminal for which a value of the throughput is maximum; and in a case where the number of the selected radio terminals is larger than the number of the antennas included in the predetermined area, calculating a throughput between third radio terminal among the selected plurality of antennas and each of the plurality of antennas included in the predetermined area;

determining combinations of the third radio terminal and antenna for which a value of the throughput is maximum;

calculating a throughput between fourth radio terminal among the selected plurality of radio terminals and each of the plurality of antennas included in the predetermined area; and determining combinations of the fourth radio terminal and antenna for which a value of the throughput is maximum.

* * * * *